Aug. 5, 1969  H. R. AXELROD  3,459,221
MANIFOLD VALVE ASSEMBLY
Filed July 22, 1966
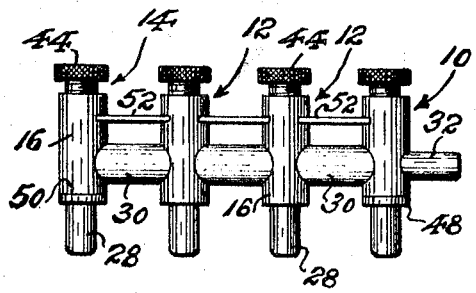
Fig. 1
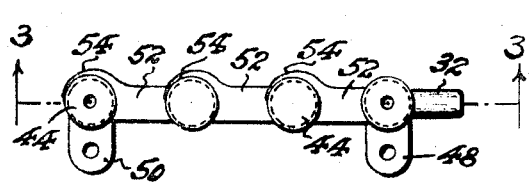
Fig. 2
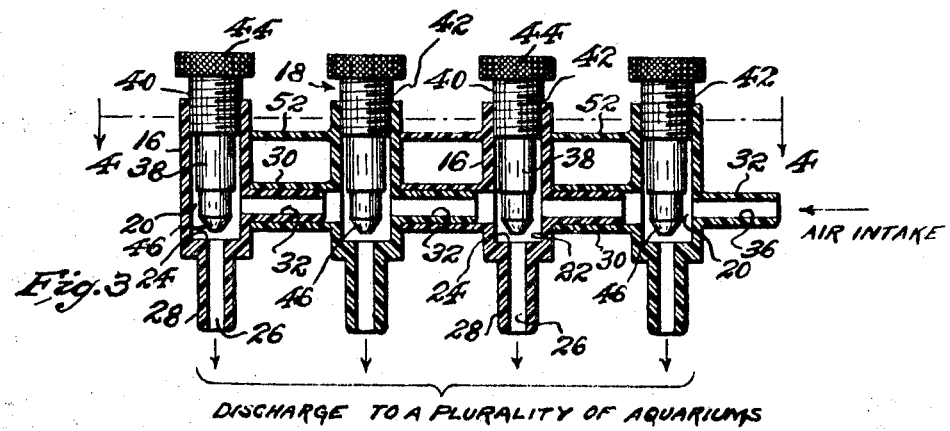
Fig. 3
DISCHARGE TO A PLURALITY OF AQUARIUMS
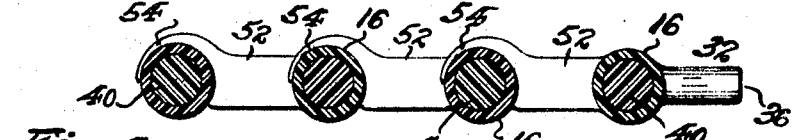
Fig. 4
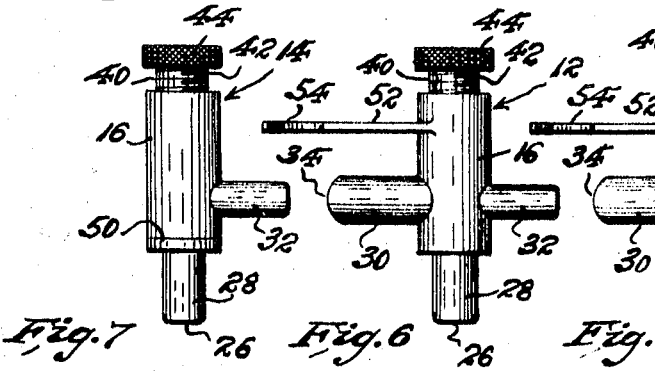
Fig. 7   Fig. 6   Fig. 5
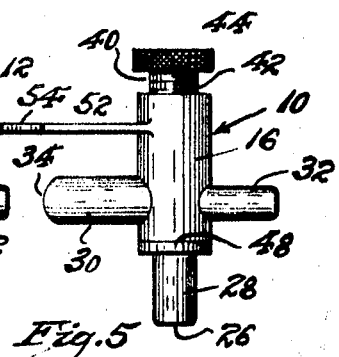
INVENTOR.
Herbert R. Axelrod,
BY Richards & Cifelli,
Attorneys

# United States Patent Office 3,459,221
Patented Aug. 5, 1969

3,459,221
MANIFOLD VALVE ASSEMBLY
Herbert R. Axelrod, Deal, N.J., assignor to T.F.H. Publications, Inc., Jersey City, N.J., a corporation of New Jersey
Filed July 22, 1966, Ser. No. 567,184
Int. Cl. E03b 9/00; F17d 3/00
U.S. Cl. 137—608       2 Claims

ABSTRACT OF THE DISCLOSURE

A manifold valve apparatus comprising a plurality of valves, each including a valve body formed with a through vertical bore having a threaded portion at its upper extremity, a reduced-in-diameter section defining a valve seat and an exit port at the bottom end thereof. A valve stem is formed with a threaded shank for engagement with the threaded portion and has a lower end defining a poppet, or seal, for seating on the seat. Certain of the valves include a female nozzle which projects transversely of the vertical bore and a male nozzle which projects oppositely thereof and is in communication with the female nozzle. The male nozzles telescopically interfit the female nozzles of adjacent valves whereby said valves may be connected together in series to receive air from a single source and provide controlled flow at said exit ports.

---

This invention relates to a manifold valve, and more particularly to plastic valve units that may be joined together to form a valve assembly adapted to be interposed in aquarium airlines for the regulation and control of the flow and distribution of air to an aquarium system.

The study of fish and their habits is a popular hobby and scientific pursuit. The aquariums that are generally used in homes for this purpose are relatively small and because of the expense and inconvenience of providing a water outlet and associated drain, the water in home aquariums is replaced at infrequent intervals. It is customary in the maintenance and operation of home aquariums to provide vital air for the fish life processes and remove noxious gases present in the aquarium water by aeration.

A conventional aerating system may consist of an electrically operated air pump capable of delivering a volume of air that exceeds the requirement of the aquarium system, connected by plastic tubing to an aerator, such as porous stone, placed under the surface of the water in the aquarium. Frequently more than one aquarium tank is supplied by air from a simple air pump as it is much less costly to manufacture one pump of large capacity than the number of smaller pumps that would be required to supply individually each aquarium in use. Thus, a two, three or four way valve in the air line permits one to supply air to several aquarium tanks from a single air pump of large capacity, at considerable economic advantage.

In the past, air control valves for aquarium systems have been designed with a single air inlet from the pump and a plurality of outlets to plastic tubes leading to the several aquarium tanks. The distribution of air to the two or more outlets have been controlled by a single needle valve that regulates the air flow through all of the exit ports, or, by a plurality of interconnected valve members. Such gang valves have previously been manufactured as a single unit.

It is an object of the present invention to provide individual valve units, which can be readily interconnected to form a valve assembly of any desired number of valves.

Another object of the present invention is to provide a simplified two part valve unit that may be manufactured of injection molded thermoplastic material.

It is also an object of this invention to provide a valve assembly of the character indicated which may be economically manufactured and which may be rapidly assembled and disassembled by the hobbyist without the use of tools.

It is a further object of this invention to provide a valve unit wherein the parts may be readily interchanged as desired, the units functioning in an efficient manner under the wide range of circumstances encountered in aquarium practice.

Other and further objects, benefits and advantages of this invention will become apparent from the following description and from the accompanying drawings in which:

FIGURE 1 is a front side elevation of a valve assembly in accordance with the present invention;

FIGURE 2 is a top end plan view;

FIGURE 3 is a longitudinal sectional view, taken on line 3—3 in FIGURE 2, and drawn on an enlarged scale;

FIGURE 4 is a horizontal sectional view, taken on line 4—4 in FIGURE 3;

FIGURE 5 is an elevational view of the air intake valve unit;

FIGURE 6 is an elevational view of an intermediate manifold valve unit; and,

FIGURE 7 is an elevational view of the far end terminal unit of the valve assembly.

As shown in FIGURE 1, the valve assembly of the present invention is formed of four valve units, an air intake valve unit 10, two intermediate manifold valve units 12 that are identical in construction and a terminal valve unit 14. It will be understood that any number of intermediate manifold valve units 12 may be inserted between the air intake valve unit 10 and the terminal valve unit 14 depending upon the particular requirements of an aquarium system; or the intermediate valve units may be eliminated if a two unit valve assembly consisting of an air intake valve unit interconnected with a terminal valve unit is desired.

The different valve units that are interconnected to produce the valve assembly illutrated in FIGURE 1 are similar in structure and will be described with particular reference to the intermediate manifold valve unit 12.

As shown in FIGURES 1–4, and 6, the intermediate manifold valve 12 is formed of two principal parts, a valve sleeve 16 and a valve member designated generally by the numeral 18. Each of the members comprising the valve unit is advantageously formed of a thermoplastic material as by the injection molding process permitting the economical large-scale production of these members. In the intermediate manifold valve unit 12, the sleeve 16 is comprised of a generally cylindrical body having an axial bore 20 extending therethrough.

At one end of the sleeve 16 the wall 22 defining the axial bore 20 terminates inwardly and forms a generally circumferential ledge 24, that functions as a valve seat and restricts the diameter of the axial bore from that point to an exit port 26, at that end of the sleeve. The external diameter of the sleeve is reduced at the exit port to form an air outlet nozzle 28 adapted to be received in the end of a section of hose or tubing connecting the exit port to an aeration device within an aquarium.

At the other end of the sleeve 16, the axial bore 20 terminates in a threaded section 29.

The valve sleeve 16 is further provided with a pair of diametrically opposed radially extending nozzles 30 and 32 which define ports 34 and 36 communicating with the axial bore 20 and forming a transverse passage through the valve sleeve. For reasons that will be explained hereinafter, the external diameter of the nozzle 32 is an important feature of the invention being slightly smaller than the internal diameter of the nozzle 30, at the exit port 36, and substantially equal to the internal diameter of the nozzle 30 throughout the remainder of the length of the nozzle.

The valve member 18 is concentrically positioned within the axial bore 20 and comprises a valve stem 38 of somewhat smaller diameter than the axial bore defined by the wall 22, and a valve shank 40 having circumferential threads 42 that complement and engage the threaded section 29 of the axial bore.

One end of the valve shank terminates in a knurled flange 44 that may be grasped for rotation of the valve member. As will be apparent from FIGURE 3, rotation of the valve member will cause the relative movement of one end 46 of the valve stem with respect to the valve seat.

The air intake valve unit 10 is identical in construction with the manifold valve unit 12 described above with the exception of a mounting tab 48 formed integral with the valve sleeve 16. A similar mounting tab 50 projects from the terminal valve unit 14. These mounting tabs may be inserted between the bottom of the aquarium and the stand or table on which it rests. The weight of the aquarium full of water is sufficient to hold the valve assembly in place without actually fastening the valve units to the aquarium tank.

The dimensions of the nozzles 30 and 32 that project radially from the air intake valve unit 10 are identical with the dimensions of the nozzles 30 and 32 that project from the intermediate manifold valve 12.

The terminal valve unit 14 is identical in construction with the manifold valve unit 12 described above except for the mounting tab 50 discussed above and the elimination of the radially extending nozzle 30 and exit port 34.

The dimensions of the nozzle 32 that projects radially from the terminal valve unit 14 is identical with the dimensions of the nozzle 32 that projects from the intermediate manifold valve 12.

From the above description, it will be understood that a valve assembly of two units may be obtained by inserting the nozzle 32 of the terminal valve unit 14 (FIGURE 7) within the nozzle 30 of the air intake valve unit 10 (FIGURE 5). As indicated above, the nozzle 32 has an external diameter substantially equal to the internal diameter of the nozzle 30 so that when the reduced end of the nozzle 32 is inserted into the nozzle 30 and the two valve units pressed together a gas tight "press fit" is obtained. Preferably the valve units are molded of a thermoplastic material such as polypropylene, polyethylene or plasticized polystyrene as such thermoplastic materials are sufficiently resilient to form a gas tight "press fit" seal when two or more valve units are pressed together.

A valve assembly of three or more units may be obtained by inserting one or more intermediate manifold valve units 12 between an air intake valve unit 10 and a terminal valve unit 14. FIGURES 1 and 3 illustrate a four valve unit assembly wherein two intermediate manifold valves are joined in series with an air inlet valve and a terminal valve unit by inserting the nozzle 32 of each valve unit into the nozzle 30 of the next adjacent valve unit in the assembly.

Desirably, the air intake valve unit and the intermediate manifold valve units are molded with a projection 52 extending from the sleeve 16 parallel to and in alignment with the nozzle 30. The terminal end 54 of the projection is semicircular in shape and dimensioned to engage and encircle the valve sleeve of an adjacent valve of similar construction when two such valves are joined, thus preventing accidental disengagement of the individual valve units.

In operation, air from the air pump is supplied to the air intake and the flow of air to the aquarium through the exit ports 26 is controlled by manual adjustment of the valve member associated with that particular valve unit.

What is claimed is:
1. Manifold valve apparatus, comprising:
   a plurality of valves, each including a valve body formed with a through bore having a threaded portion at one extremity, a reduced-in-cross section portion defining a valve seat and an exit port at the other extremity thereof, a valve stem formed with a threaded shank for engagement with said threaded portion;
   a female nozzle extending transversely of said bore; and
   a male nozzle extending oppositely said female nozzle and in communication therewith, the cross section of said male nozzle being sized for telescopically interfitting said female nozzle whereby said plurality of valves may be assembled by inserting said male nozzle of certain of said valves into said female nozzles of other of said valves to form an apparatus for receiving air in one of said nozzles and metering it out said individual air exits,
   the body of one of said valves including an integral flange projecting therefrom and having its extremity formed to partially encompass the body of a valve joined therewith.
2. Manifold valve apparatus as set forth in claim 1 wherein:
   said male and female nozzles are aligned.

References Cited

UNITED STATES PATENTS

| 2,791,236 | 5/1957 | Mauer | 137—608 |
| 1,365,025 | 1/1921 | Elder | 137—78 |
| 3,092,141 | 6/1963 | Stark | 137—608 |
| 3,039,489 | 6/1962 | Botkin | 137—608 |
| 2,598,961 | 6/1952 | Andrus | 137—78 |
| 3,298,396 | 1/1967 | Gressman et al. | 137—637.4 |

FOREIGN PATENTS

| 721,998 | 11/1965 | Canada. |
| 953,564 | 3/1964 | Great Britain. |

SAMUEL SCOTT, Primary Examiner